UNITED STATES PATENT OFFICE.

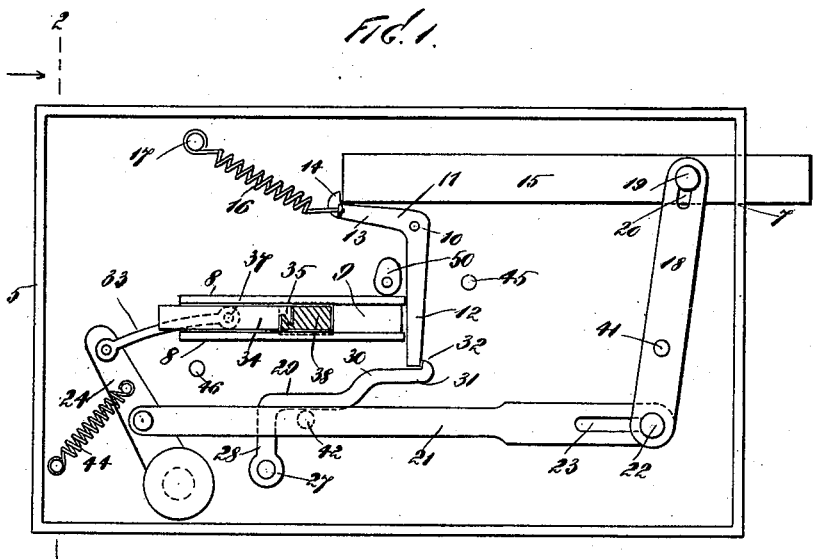

STEPHEN F. KINSELLA, OF AUBURN, NEW YORK.

LOCK.

SPECIFICATION forming part of Letters Patent No. 594,697, dated November 30, 1897.

Application filed August 5, 1896. Serial No. 601,724. (No model.)

*To all whom it may concern:*

Be it known that I, STEPHEN F. KINSELLA, a citizen of the United States, and a resident of Auburn, in the county of Cayuga and State of New York, have invented certain new and useful Improvements in Locks, of which the following is a specification, reference being had to the accompanying drawings, forming a part thereof, in which similar numerals of reference indicate corresponding parts wherever found throughout the several views.

This invention relates to locks; and the object thereof is to provide an improved device of this class which is adapted to be connected with a door, gate, or hinged window; and with this and other objects in view the invention consists in the construction, combination, and arrangement of parts hereinafter described and claimed.

The invention is fully disclosed in the following specification, of which the accompanying drawings form a part, in which—

Figure 1 is a side view of my improved lock with the face of the casing removed; Fig. 2, a section on the line 2 2 of Fig. 1; Fig. 3, a plan view of a detail of the construction; Fig. 4, a sectional side view of a key which I employ; Fig. 5, a view similar to Fig. 4, showing a modified form of key; and Fig. 6, end edge view showing the key-head in section.

In the practice of my invention I provide an oblong rectangular casing 5, having a removable side or face plate 6, and one end of said casing is provided with an opening 7, through which the lock-bolt is adapted to be projected, and said casing is provided centrally thereof, and near the end opposite the opening 7, with two parallel plates 8, which are secured to or formed on the back thereof and which form an oblong rectangular space or chamber 9 when the removable side or face plate 6 is in position.

Pivoted within the casing at 10 is a lever 11, provided with a depending straight arm 12 and with a backwardly and upwardly directed arm 13, having a head 14, which is adapted to abut against the inner end of the lock-bar 15, and secured to the head 14 of the lever 11 is an expansive spring 16, one end of which is secured to the back of the casing at 17.

The forward end of the lock-bar 15 is pivotally connected with a lever 18 by means of a pivot-pin 19, which passes through a slot 20, formed in said lever, and into said lock-bar, and the lower end of the lever 18 is pivotally connected with a longitudinally-movable bar 21 by means of a pivot-pin 22, which passes through the lower end of said lever 18 and through an oblong slot 23, formed in the bar 21.

The rear end of the bar 21 is pivotally connected with a crank 24, which is formed on or secured to the shaft 25, with which the knobs or handles 26 of the lock are connected, and pivotally connected with the back of the casing at 27 is an angular lever 28, one arm of which projects forwardly, as shown at 29, parallel with the bar 21, and said forwardly-directed arm 29 is provided with an upwardly-directed curve 30, from which said arm projects parallel with the bar 29, as shown at 31, and the end thereof is provided with an upwardly-directed projection 32, against which the lower end of the lever 11 or arm 12 thereof is adapted to abut.

The lower end of the arm 12 of the lever 11 is also adapted to abut against the ends of the parallel plates 8, as shown in Fig. 1, and pivotally connected with the free end of the crank 24 is a rod 33, which is pivotally connected with a sliding bolt 34, hinged between the plates 8, the inner end of which is provided with a downwardly-directed transverse hook or projection 35.

The bolt 34 is rectangular and oblong in cross-section, and the rear end thereof is divided vertically and provided with an oblong slot 36, and the rod 33 passes into said slot and is pivotally connected with said bolt at 37.

I also provide a key, one form of which is shown in Fig. 4 and which consists of a head or block 38, provided with a detachable handle 39, and the head 38 of the key is shown in section in Fig. 1, and said key is rectangular in form and provided at one side with a hook or projection 40, which is adapted to interlock with the hook or projection 35 on the bolt 34, and the operation will be readily understood from the foregoing description, when taken in connection with the accompanying drawings and the following statement thereof. The lever 18 is pivoted at 41, and the bar 21 is provided with a backwardly-directed pin, lug, or projection 42, which is adapted to support the lever 29. The position of the parts of the lock when said lock is set or the door to which it is applied is locked is that shown in Fig. 1, and whenever it is desired to unlock the door the key head or block 38 is inserted through a hole at 43 and the handle is detached therefrom. In inserting the head of the key the hook or projection 40 thereon engages with the hook or projection 35 on the bolt 34, and after the handle 39 of the key has been detached the door may be unlocked by turning one of the knobs or handles 26. In this operation the bolt 34 is pressed forwardly until the head 38 of the key strikes the arm 12 of the lever 11. At the same time the bar 21 is moved forwardly, carrying with it the pin or projection 42, and when said pin or projection reaches the bend 30 in the lever 28 said lever will drop downwardly and be freed from the arm 12 of the lever 11. At this time the arm 12 of the lever 11 is pressed forwardly by the key head or block 38 and the head 14 of the lever 11 is released from the inner end of the lock-bolt 15 and said lock-bolt 15 is moved backwardly by the bar 21 and the lever 18. The slot 23 in the bar 21 permits said bar to move forwardly without moving the lever 18 until the lever 28 has been disconnected from the lever 11, and the spring 16 serves at all times to return the lever 11 to the position shown in Fig. 1, and I also provide a spring 44, which is connected with the crank 24, the function of which is to return said crank and the parts connected therewith to the position shown in Fig. 1, and secured to the back of the casing are pins 45 and 46, which serve to limit the movement of the lever 11 and the crank 24 when said crank is turned forwardly by the knobs or handles 26.

In Fig. 4 I have shown the handle 39 of the key as connected with the key head or block 38 by means of a screw-thread formed thereon; but any preferred means may be employed for this purpose, and it will be understood that whenever it is desired to unlock the door the key-head must be inserted and the handle detached, and after the door has been unlocked and the parts returned to the position shown in Fig. 1 the handle may be again inserted and connected with the key-head and the latter removed. It will be noticed that the arm 13 of the lever 11 is substantially parallel with the lock-bolt 15, so that the lock-bolt cannot operate the lever 11, and in case any one attempted to unlock the door when the inner end of slot 23 in the bar 21 reached the pin 22, although the lever 29 would drop and disengage the nose 32 from the arm 12 of the lever 11, the door would still remain securely locked for the reason that the bolt 15 could not actuate the lever 11, this lever being actuated only by the arm 12. It will thus be seen that the door cannot be unlocked without the use of a key-head similar to that herein described, and the fact that the handle must be disconnected from the key-head before the door can be unlocked constitutes one of the chief security features of my improved lock.

One of the chief features of this invention consists in the fact that the keyhole must be closed before the lock can be operated by turning one of the knobs or handles 26; but I also provide a device whereby the lock may be opened or operated from the inside without a key, and this device consists of a cam-block 50, which is mounted within the casing of the lock on a short shaft which projects therethrough and which is provided with a knob or head 51, and with this device in position all that is necessary is to turn the inner knob or handle 26, as hereinbefore described, and after the end 30 of the lever 28 has dropped downwardly, as hereinbefore described, the knob or handle 51 may be turned to operate the arm 12 of the lever 11.

I have also shown in Figs. 5 and 6 a modified form of key which may be used instead of that shown in Fig. 4 and which consists of two circular plates bolted together, as shown at 52, each of which is provided with an outwardly-curved spring-arm 53, which form the shaft of the key, and said spring-arms are brought together at 54 and provided with spring-jaws 55, which are adapted to engage with the cylindrical part 56 of the key head or block 38, and this connection may be easily made by simply forcing the jaws 55 against the cylindrical part 56 of said key-head, this operation forcing said jaws apart until the cylindrical portion of the key-head enters between the same, and these parts may be disconnected at any time by simply pulling on the handle or head 52, with which the spring-arms 53 are connected.

My invention is not limited to the exact form, construction, and arrangement of the various parts of my improved lock as herein shown and described, as it is evident that changes therein and modifications thereof may be made without departing from the spirit of my invention or sacrificing its advantages.

Having fully described my invention, I claim as new and desire to secure by Letters Patent—

1. In a lock, the combination with a suitable casing, of a sliding lock-bolt, a lever by which said bolt is operated, a bar connected with said lever at one end, and at the other with a crank formed on or secured to the knob-shaft, a pivotally-supported lever for holding the lock-bar in the projected position, and a sliding bolt operated by said crank, for operating said lever, a detachable key head or block operating in connection with said sliding bolt substantially as described.

2. In a lock, the combination with a suitable casing, of a sliding lock-bolt, a lever by which said bolt is operated, a bar connected with said lever at one end, and at the other with a crank formed on or secured to the knob-shaft, a pivotally-supported lever for holding the lock-bar in the projected position, and a sliding bolt operated by said crank, for operating said lever, a detachable key head or block operating in connection with said sliding bolt, and a pivotally-supported angular lever one arm of which rests upon a pin or projection formed on said bar, said arm being also provided with an upwardly-directed bend, and with a hook or projection which operates in connection with the lower end of the lever by which the lock-bolt is held in a projected position, substantially as shown and described.

3. In a lock, the combination with a suitable casing, of a sliding lock-bolt mounted therein, a lever pivotally connected therewith, a sliding bar pivotally connected with the lower end of said lever at one end, and provided with a slot through which the pivot-pin passes, said sliding bar being pivotally connected at its other end with a crank, formed on or secured to the knob-shaft, a sliding bolt operated by said crank, a detachable key or block adapted to operate in connection with said sliding bolt, and a lever by which the lock-bolt is held in the projected position, and which is adapted to be operated by said key head or block, substantially as shown and described.

4. In a lock, the combination with a suitable casing, of a sliding lock-bolt mounted therein, a lever pivotally connected therewith, a sliding bar pivotally connected with the lower end of said lever at one end, and provided with a slot through which the pivot-pin passes, said sliding bar being pivotally connected at its other end with a crank, formed on or secured to the knob-shaft, a sliding bolt operated by said crank, and adapted to operate in connection with a detachable key head or block, and a lever by which the lock-bolt is held in the projected position, and which is adapted to be operated by said key-head, and springs connected with said last-named lever, and with the crank for holding the same in operative position, substantially as shown and described.

5. In a lock, the combination with a suitable casing, of a sliding lock-bolt mounted therein, a lever pivotally connected therewith, a sliding bar pivotally connected with said lever and with a crank formed on or secured to the knob-shaft, other levers by which the lock-bolt is held in proper position, and means for operating said levers consisting of a sliding bar connected with said crank, and a detachable key or block which is adapted to be connected with said sliding bar, said key-head being adapted to be inserted and connected with said sliding bar, after which the handle of the key is detached from the head, and the keyhole left closed before the lock can be turned, substantially as shown and described.

6. In a lock, the combination with a suitable casing, of a sliding lock-bolt mounted therein, a lever pivotally connected therewith, a sliding bar pivotally connected with said lever and with a crank formed on or secured to the knob-shaft, other levers by which the lock-bolt is held in proper position, and means for operating said levers consisting of a sliding bar connected with said crank, and a detachable key head or block which is adapted to be connected with said sliding bar, said key-head being adapted to be inserted and connected with said sliding bar, after which the handle of the key is detached from the key-head, and the keyhole left closed before the lock can be turned, and said lock being also provided with means whereby it may be operated from the inner side without a key, substantially as shown and described.

7. A lock which is operated by a crank connected with the knob-shaft, said crank being connected with a sliding bolt by which the lock mechanism is operated, and said sliding bolt being adapted to be detachably connected with a detachable key head or block, said key-head being disconnected from the key before the lock is operated, substantially as shown and described.

In testimony that I claim the foregoing as my invention I have signed my name, in presence of the subscribing witnesses, this 3d day of August, 1896.

STEPHEN F. KINSELLA.

Witnesses:
ANNIE KINSELLA,
KATIE KINSELLA.